United States Patent [19]

Gordy et al.

[11] 4,017,798
[45] Apr. 12, 1977

[54] SPREAD SPECTRUM DEMODULATOR

[75] Inventors: Robert S. Gordy, Largo; Alfred T. Anderson; David E. Sanders, both of St. Petersburg, all of Fla.

[73] Assignee: NCR Corporation, Dayton, Ohio

[22] Filed: Sept. 8, 1975

[21] Appl. No.: 611,367

[52] U.S. Cl. .................................. 325/42; 325/30; 325/65

[51] Int. Cl.² ......................................... H04B 1/62

[58] Field of Search ............. 325/38 R, 41, 42, 65, 325/30; 178/68, 69 R; 328/155, 162; 332/9 R; 340/146.1 A, 146.1 D

[56] References Cited
UNITED STATES PATENTS

| | | | |
|---|---|---|---|
| 3,706,933 | 12/1972 | Bidell et al. | 325/42 |
| 3,916,313 | 10/1975 | Lowry | 325/65 |

*Primary Examiner*—Benedict V. Safourek
*Attorney, Agent, or Firm*—J. T. Cavender; Edward Dugas

[57] ABSTRACT

Demodulation of a wideband spread spectrum four-phase PSK (phase shift keyed) modulated carrier signal is accomplished by means of a correlator which phase shifts the modulated carrier signal as a function of a locally generated PN (pseudo-noise) sequence to provide a narrow band two-phase PSK modulated carrier signal. The two-phase modulated signal is fed to a matched filter wherein undesired signal components are removed so as to provide an IF (intermediate frequency) signal. A carrier recovery phaselock loop demodulates the two-phase modulated IF signal to provide a baseband signal. A timing recovery loop operates upon the baseband signal to provide timing signals for the locally generated PN sequence to synchronize the local PN sequence with the modulated carrier sequence. A bit timing loop and a sample and hold means operate upon the baseband signal to detect the modulating data to provide an output signal which is a function of the modulating data.

14 Claims, 14 Drawing Figures

FIG. 11a
PSK SIGNAL UNSPREAD TX 26 OUT

FIG. 11b
PSK SIGNAL SPREAD TX 26 OUT

FIG. 11c
RX 30 INPUT SIGNAL

FIG. 11d
CORRELATOR 33 OUT

SPREAD SPECTRUM DEMODULATOR

BACKGROUND OF THE INVENTION

The present invention is related to the field of spread spectrum communications systems and more particularly to an improved spread spectrum demodulator utilizing matched filtering techniques.

Spread spectrum communication systems utilize a transmission bandwidth many times as large as the information bandwidth in order to achieve jam resistance. Additional advantages include multipath signal rejection and a low probability of detection. A spread spectrum transmitter generates a data modulated signal, which signal has its energy spread over a frequency band considerably wider than the data rate. Generally a PN sequence is used to modulate the phase of the carrier signal. Within the receiver there is usually provided a matched filter which filter is designated to have an impulse response which is the time-reverse of the transmitter's output waveform. The matched filter thus provides a match between the transmitted waveform and the receiver's response. Matched filters that utilize surface acoustic wave devices (SAW's) have been used in spread spectrum data transmission systems.

Two publications of interest for purposes of establishing the state of the art are "Surface Acoustic Wave Devices And Applications" by D. P. Morgan, Ultrasonics, May 1973, pages 121–128; and "Surface Acoustic Wave Devices And Applications (Spread Spectrum Processors)" by B. J. Hunsinger, Ultrasonics, November 1973, pages 254–263.

SUMMARY OF THE INVENTION

In the spread spectrum demodulator of the present invention there is provided a correlator for phase shifting a four-phase wideband PSK modulated signal in response to a local PN sequence in order to provide a two-phase narrow band signal. The two-phase signal is applied to a matched filter the output of which is an IF signal. The IF signal is then applied to a carrier recovery phaselock loop wherein demodulation takes place to provide a baseband data signal. A bit timing loop and a sample and hold circuit operate upon the baseband data signal to reconstruct the information data. A PN timing recovery loop also receives the IF signal from the matched filter along with a clocking signal from the bit timing loop to provide a synchronizing signal to the local PN sequence generator. Improved demodulation is achieved by positioning the matched filter prior to the carrier recovery phaselock loop and by transmitting the wideband signal in four-phase and by converting it early in the receiver into a two-phase narrow band signal.

From the foregoing it can therefore be seen that it is a primary object of the present invention to provide an improved spread spectrum demodulator.

It is another object of the present invention to provide a spread spectrum demodulator wherein a four-phase wideband signal is changed to a two-phase narrow band signal early in the demodulation process.

These and other objects of the present invention will become more apparent when taken in conjunction with the following description and drawings wherein like characters indicate like parts and which drawings form a part of the present disclosure.

DESCRIPTION OF THE PREFERRED EMBODIMENT OF THE INVENTION

Figure 1:
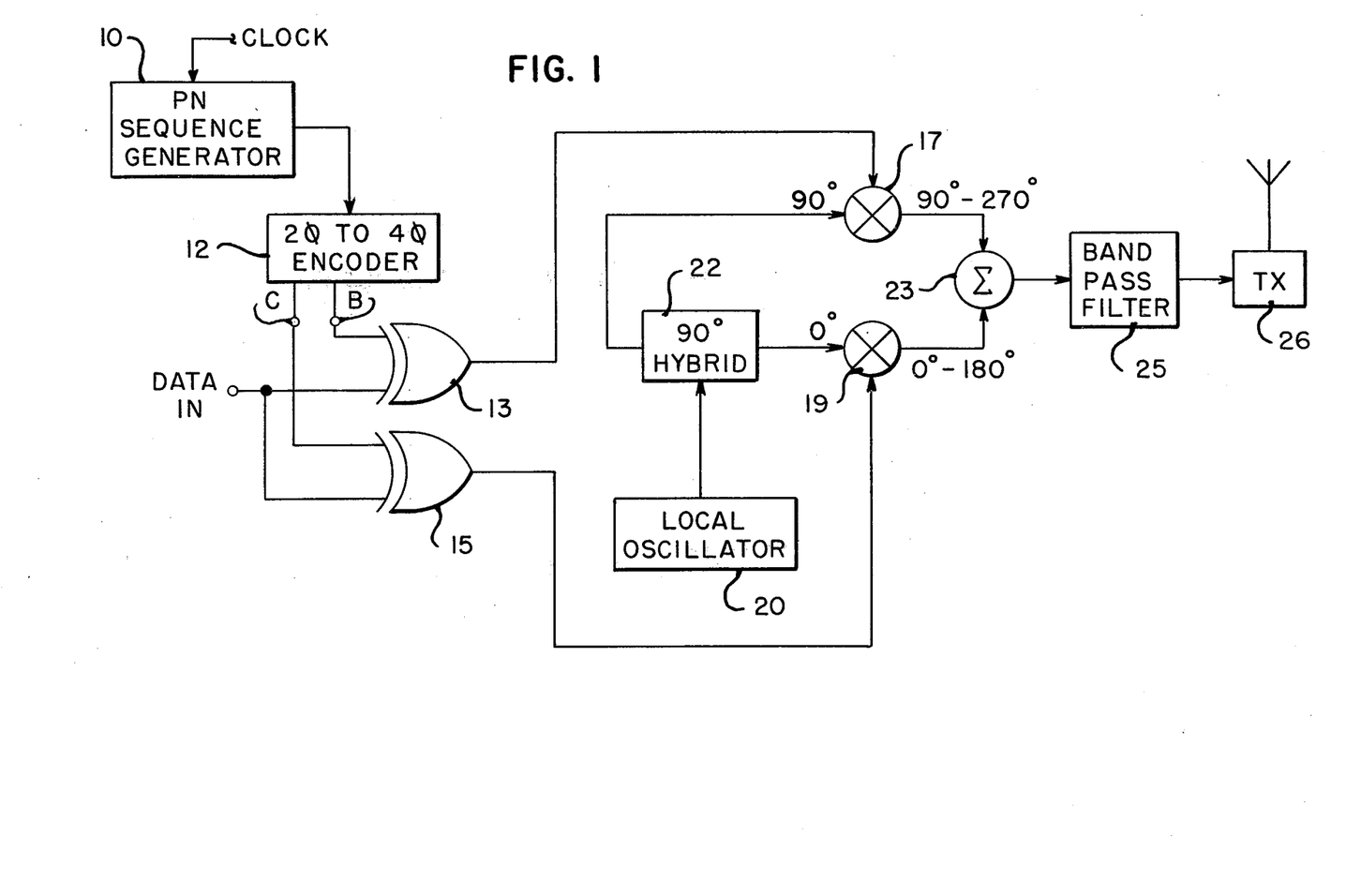
FIG. 1 illustrates in block diagram form a spread spectrum modulator which may be utilized with the present invention.

In FIG. 1 there is disclosed the modulating portion of a data modulated transmission system, of the spread spectrum type, which system codes an information signal in a particular format and utilizes the encoded information signal to spread spectrum modulate a carrier signal. A PN sequence generator 10, in response to a clock signal, provides a pseudo-random binary bit sequence of pulses to an encoder 12. The PN sequence generator 10 may be, for example, a multistage shift register having feedback from selected ones of the multistages. The clock signal controls the shifting of pulses through the stages of the shift register. The pseudo-random binary bit sequence of pulses is generally taken from the last stage of the shift register.

In a single channel phase shift keyed modulated system, a binary signal will control a phase modulator in two phases; one phase for a binary 0 and another phase for a binary 1. Therefore, the sequence of pulses from the PN sequence generator 10 are two phase (2φ) in function. The particular sequence of bits generated by the PN sequence provides the transmitter with a particular "signature" of its own, that is, a receiver will not be able to demodulate a data signal that is mixed with the "signature" signal unless the "signature" signal is first known to the receiver.

Encoder 12 converts the 2φ pseudo-random binary pulse sequence into a pseudo-random 4φ sequence. This is accomplished by causing every even positioned bit from the pseudo-sequence to appear at terminal B and every odd positioned bit to appear at terminal C. The signal at terminal B will therefore be a binary signal (2φ) the bits of which represent the "even" bits of the pseudo-random sequence; while the signal at terminal C will be a binary signal (2φ) the bits of which represent the "odd"

bits of the pseudo-random sequence. This particular encoding technique enables a 4ϕ modulation of a carrier signal; therefore the encoding is called a 2ϕ to 4ϕ encoding. The (binary) data to be transmitted is applied, in serial form, to the input terminals of EXCLUSIVE-OR gates 13 and 15. The B terminal output of encoder 12 is applied to an input of the EXCLUSIVE-OR gate 13 with the C terminal output of encoder 12, being applied to an input of the EXCLUSIVE-OR gate 15. The output of EXCLUSIVE-OR gate 13 will be the serial data input signal gated (mixed) as a function of the signal appearing at terminal B; with the output signal from the EXCLUSIVE-OR gate 15 being the serial input data signal gated as a function of the signal appearing at terminal C. These two gated signals are used to phase shift key modulate a local carrier signal.

A local oscillator 20 provides a carrier signal; which carrier signal is fed to a 90° hybrid circuit 22. The hybrid circuit 22 splits the carrier signal into two signals, the phases of which are shifted 90° and 0° with respect to the phase of the carrier signal from the local oscillator 20. The 90° signal is fed to an input of a phase modulator 17. The phase modulator 17 also receives as a modulating input signal the output signal from the EXCLUSIVE-OR gate 13. In response to the modulating signal from the EXCLUSIVE-OR gate 13, phase modulator 17 modulates the phase of the 90° phase shifted carrier signal between 90° and 270° according to the level of the modulating signal. The 0° phase shifted carrier signal is applied as an input to the phase modulator 19 along with the output signal from the EXCLUSIVE-OR gate 15. The signal from the EXCLUSIVE-OR gate 15 is a modulating signal that modulates the 0° phase shifted carrier signal between the phases 0° and 180° according to the level of the modulating signal. The phase modulated output signal from the phase modulator 17 is summed with the phase modulated output signal from the phase modulator 19 by the summer 23 to provide a fourphase phase shift keyed modulated (PSK) signal. The summer 23 is used to obtain a voltage that is proportional to the sum of several input voltages. A summing amplifier of the type disclosed in "Electronic Analog Computers," by Korn and Korn, McGraw Hill, 1952, page 14 may be used for summer 23. The four-phase PSK modulated carrier signal from summer 23 is fed to a bandpass filter 25 which filter removes out of band signal components. The output signal from the bandpass filter 25 is then fed to a transmitter section 26 for transmission over a communication link to a receiver.

In summary of pseudo-random bit sequence is 4ϕ encoded to provide a wideband signal which signal is combined with a relatively narrow bandwidth digital data signal to form modulating signals. The modulating signals are applied to a 4ϕ modulator wherein a carrier signal is phase shift keyed modulated to provide a spread spectrum signal having a wideband width and a low power-density.

Recovery of the narrow bandwidth digital data signal from a received spread spectrum signal requires a correlation between the exact replica of the wideband modulating signals and the received spread spectrum signal.

One type of optimum receiver for a spread spectrum signal is a receiver which utilizes a matched filter.

A matched filter is defined as a filter having a transfer function which is the complex conjugate of the spectrum of the signal to which it is matched.

The receiver of the present invention utilizes a matched filter of the surface wave type to detect the spread spectrum signal.

Figure 2:
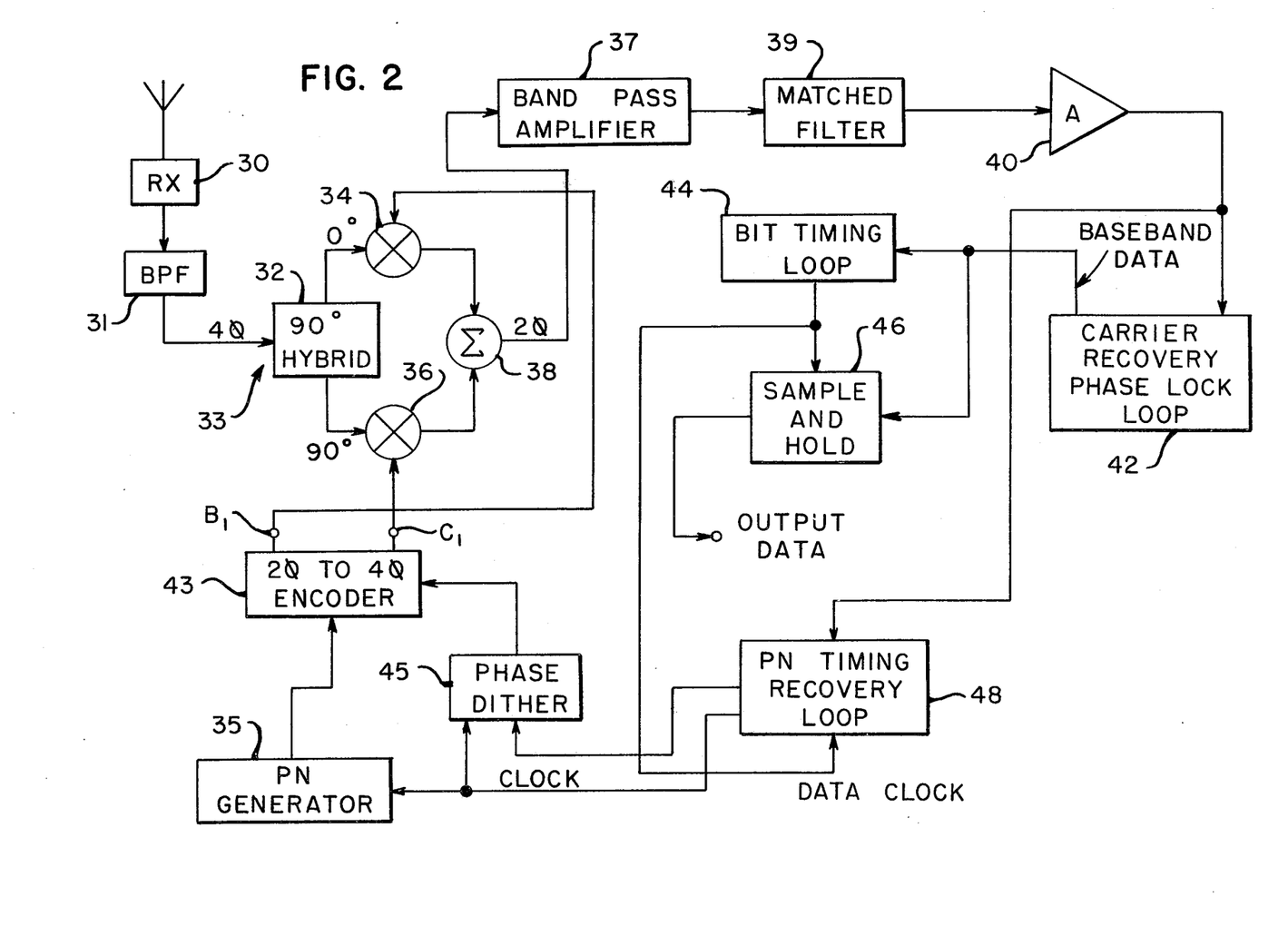
FIG. 2 illustrates in block diagram form the preferred embodiment of the invention.

Referring now to FIG. 2 a receiver 30 receives the modulated four-phase wideband signal and forwards the received signal to a bandpass filter 31. The bandpass filter removes those undesirable signal components which fall outside of the band of frequencies of interest. The output signal from the bandpass filter is fed to a correlator 33 wherein the bandwidth (spread) of the received signal is narrowed (collapsed). Within the correlator 90° hybrid circuit 32 splits the received PSK four-phase modulated wideband signal into two identical signals, one having a 90° phase shift from the received signal and the other having a 0° phase shift. The 0° phase shifted signal is applied to an input of a phase detector 34. The 90° phase shifted signal is applied to an input of a phase detector 36. Phase detector 34 also receives, as a local demodulation signal, the signal present at the terminal $B_1$, of a 2ϕ to 4ϕ encoder 43. The phase detector 36 also receives as a demodulating signal the signal C1 from the 2ϕ to 4ϕ converter 43. Each of the phase detectors provides an output signal which is a function of the phase correlation between the signals received at their inputs. The 2ϕ to 4ϕ converter 43 receives, as an input signal, a pseudo-random binary bit sequence which is generated by a PN generator 35. The sequence generated by generator 35 is identical to the sequence generated by the PN sequence generator 10, shown in FIG. 1. The output signals from phase detectors 34 and 36 are summed together in a summing circuit 38 to provide a 2ϕ narrow band IF signal. The 2ϕ narrow band signal is then applied to a bandpass amplifier 37 wherein undesired signal components falling outside of the pass band are removed. The output signal from the bandpass amplifier 37 is fed to a matched filter 39. The matched filter 39 is designed to have an impulse response which is the time-reverse of the transmitted baseband signal. The output signal from the matched filter 39 is fed to an amplifier 40 which amplifier adds signal gain. The output signal from amplifier 40 is fed to a PN timing recovery loop 48 and to a carrier recovery phaselock loop 42. The output signal from the carrier recovery phaselock loop is directed to a bit timing loop 44 and to a sample and hold circuit 46. The bit timing loop 44 provides an output signal which is a function of the bit timing and which signal controls the sampling time of the sample and hold circuit 46. The bit timing signal is also directed to the PN timing recovery loop 48 to provide a synchronizing signal for deriving a PN timing signal. The output of the sample and hold circuit 46 is the recovered data signal.

The output signal from the PN timing recovery loop 48 is directed to the local PN sequence generator 35 so as to cause the synchronization of the locally generated PN sequence with the sequence contained in the received four-phase PSK wideband signal so as to provide the correlator 33 with the correct demodulation signals.

A phase dither circuit 45 receives a control signal, and the recovered timing (clock) signal from the PN timing recovery loop 48; and in response to the control signal and the clock signal "dithers" the local PN sequence to enable the PN timing recovery loop 48 to accurately detect the phasing of the PN sequence. The term "dithering" is applied to a signal condition, wherein a signal is oscillated slightly about a locked or null position.

Figure 3:
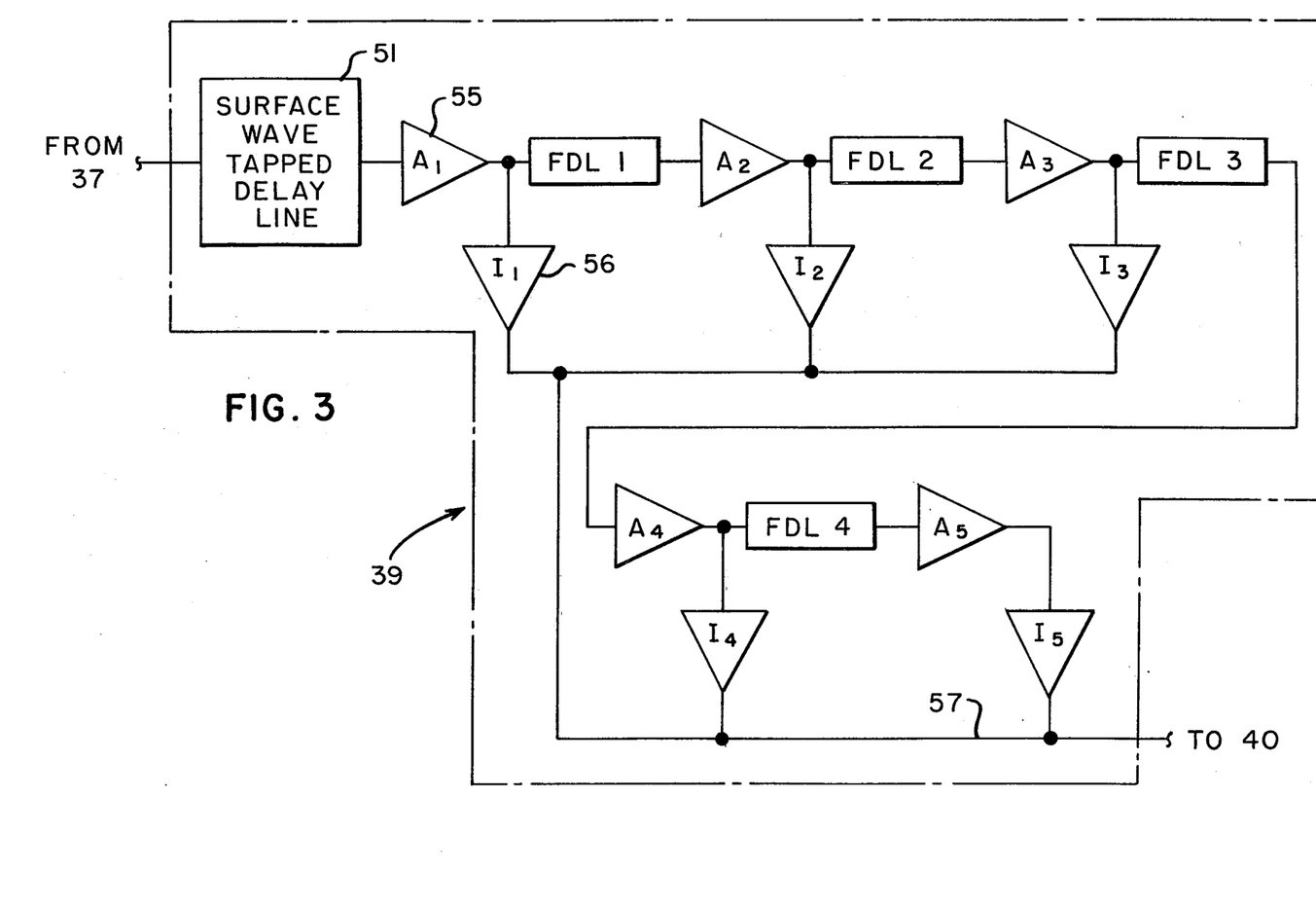
FIG. 3 illustrates in block diagram form a matched filter which may be utilized with the preferred embodiment of FIG. 2.

In FIG. 3 there is shown one preferred embodiment of the matched filter 39. The matched filter is constructed utilizing a number of surface acoustic wave (SAW) devices. The present system requires an impulse response of 100 microseconds duration to a 70MHz RF carrier pulse. The particular approach taken is to divide the propagation path length into five parts, each 20 microseconds long. The first device is a surface wave tapped delay line 51 which receives the signal from the bandpass amplifier 37. The output signal from the tapped delay line 51 is fed to four serially connected fixed delay lines (FDL) labeled FDL1 through FLD4. The output signal from the tapped delay line 51 and each of the fixed delay lines are connected by means of current amplifiers $I_1$ to $I_5$, to an output line 57. The amplifiers A1, A2, A3, A4 and A5 connected between successive fixed delay lines compensate for the insertion losses encountered in each of the delay lines.

FIGS. 8a to 8g show the relationships of the waveforms present at the input of the matched filter, the output of each amplifier, A1 to A5, and the output line 57 of the matched filter.

Figure 8:
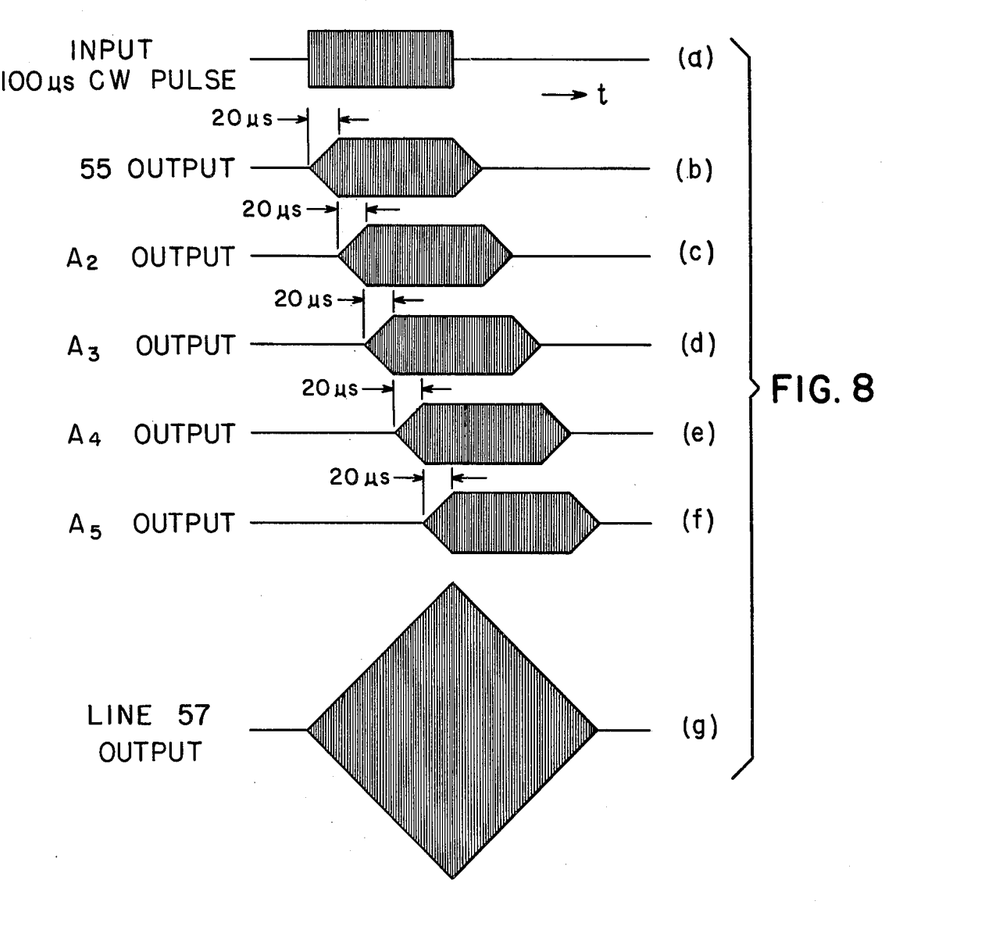
FIGS. 8a to 8g illustrate waveforms which occur at selected points in the device shown in FIG. 3.

A CW (continuous wave) burst of energy, FIG. 8a, is applied to the surface wave tapped delay line 51. The tapped delay line 51 is a 20us long matched filter that delays the CW burst by 20us. Each of the fixed delay lines FDL1 to FDL4 delay the signals at their respective inputs by 20us, (FIGS. 8b to 8f). The addition of all the amplifier outputs at line 57 results in the response shown in FIG. 8g, which response is the desired matched filter response of 100us. A more detailed description of matched filters can be found in the publication entitled, "Cascaded SAW Matched Filter", by R. S. Gordy et al., 1974 Ultrasonics Symposium Proceedings, IEE cat. No. 74 CHO 896-ISU, pages 386–388.

Figure 4:
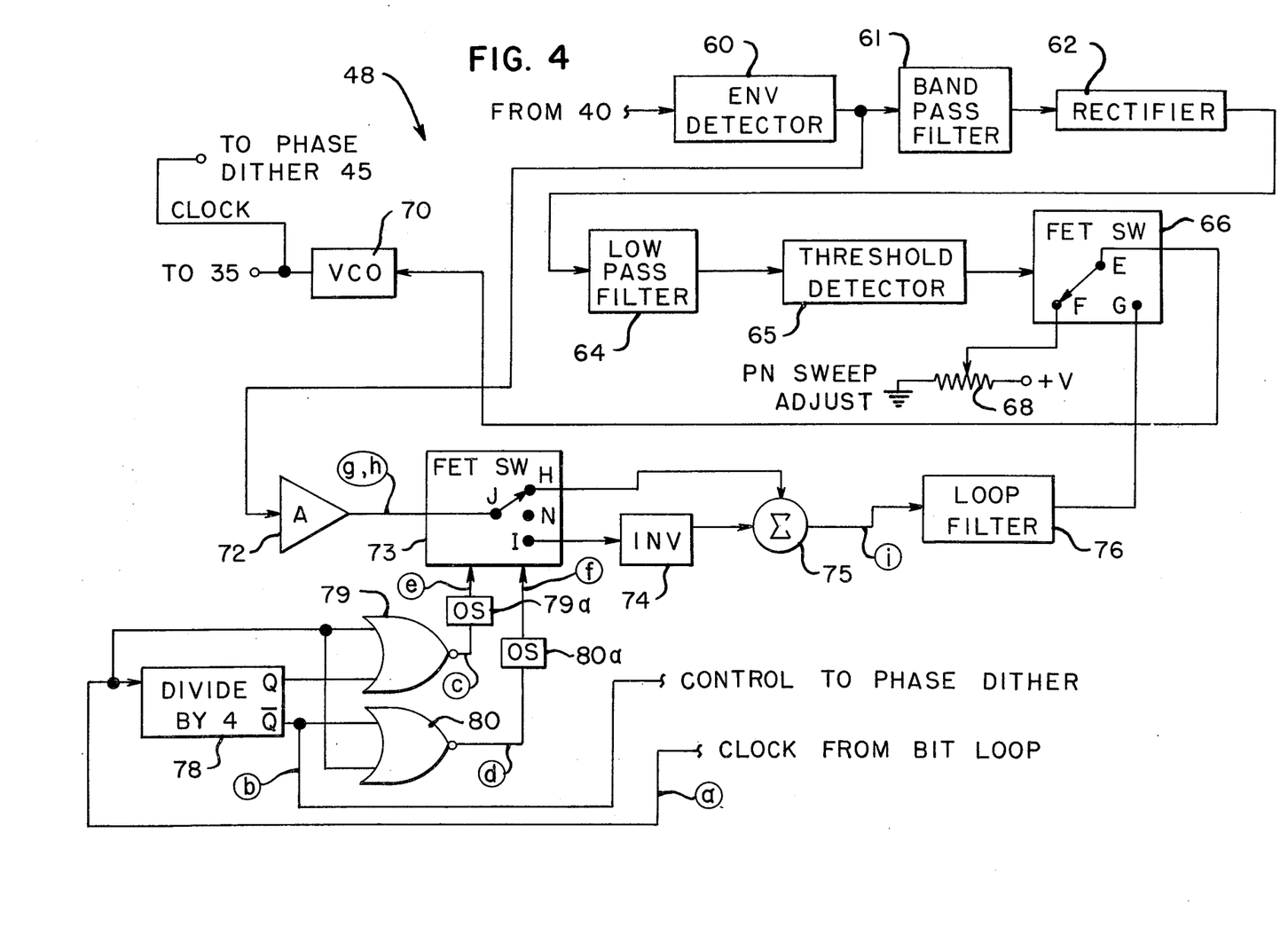
FIG. 4 illustrates in block diagram form the PN timing recovery loop control circuitry which may be utilized in the preferred embodiment of FIG. 2.
Figure 9:
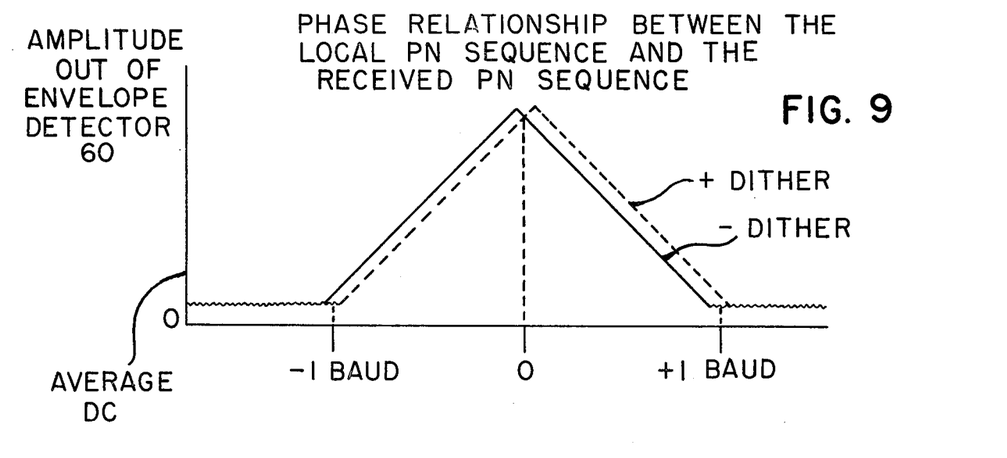
FIG. 9 illustrates waveforms useful in understanding the operation of the preferred embodiment of the invention shown in FIG. 2.

Referring now to FIG. 4 wherein there is shown one preferred embodiment of a PN timing recovery loop 48; an envelope detector 60 is connected to receive the signal present at the output of the amplifier 40 in order to provide an output signal which is a function of the envelope of the signal at its input. The detected envelope signal is fed to a bandpass filter 61 for the elimination of signal components outside of the pass band of the filter. The data PSK signal appears when the local PN sequence is within ±1 baud period of the received PN sequence. FIG. 9 illustrates this relationship. The amplitude of the envelope signal in FIG. 9 decreases substantially as the phase difference between the local PN sequence and the received PN sequence increases towards ±1 baud period. The filtered signal from filter 61 is rectified by a rectifier 62. The rectified signal from rectifier 62 is low pass filtered by the low pass filter 64 to provide a D.C. signal which is relatively free of high frequency signal components. The threshold detector 65 provides a controlling output signal to an FET switch 66, when the level of the D.C. signal from the low pass filter 64 is above a predetermined level. Terminal E of said switch is connected to terminal G under control of the signal from the threshold detector 65. The predetermined level is set so that when the same level is reached in the rectifier 62 output, which level occurs when the local PN sequence is within one baud period of the received PN sequence, the threshold detector will provide the controlling output signal.

When the FET switch 66 is in the position labeled G the signal from the envelope detector 60 is used to control a VCO (voltage controlled oscillator) 70. The VCO 70 provides a square wave (CLOCK) signal. The rate (frequency) of which is a function of the level of the signal present at the input to the VCO.

The signal from the envelope detector 60 is also applied to an amplifier 72 the output of which is connectable by means of an FET switch 73 to either the input of a summer 75, to the input of an inverter 74 or to the open terminal N.

Figure 10:
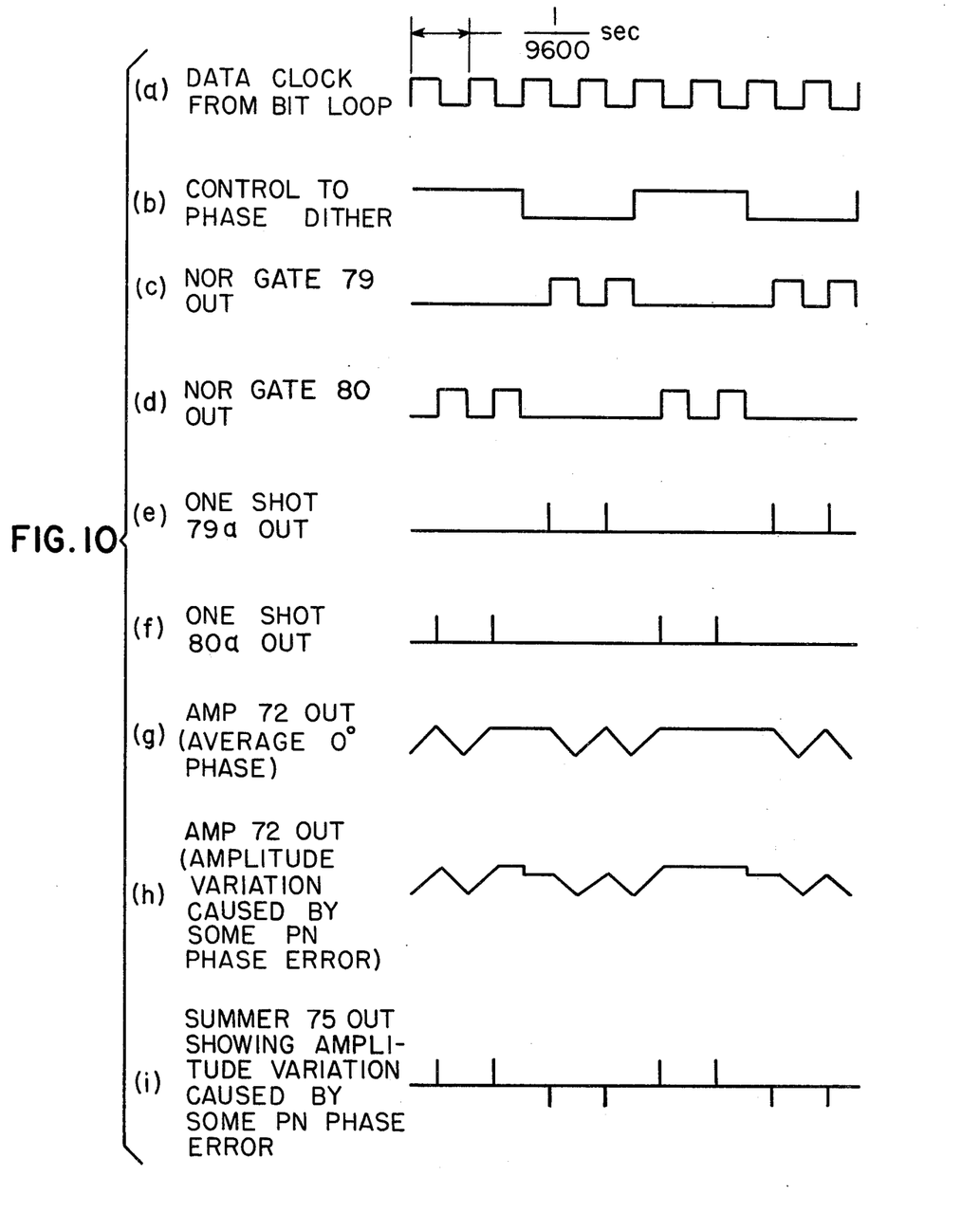
FIGS. 10a to 10c illustrate waveforms which occur in FIG. 4.

The waveforms at the output of amplifier 72 for an in-lock condition and an out-of-lock condition can be seen in FIGS. 10g and 10h, respectively. The output of the inverter 74 is directed to an input of the summer 75. The output signal from summer 75 shown in FIG. 10i is directed to a compensating loop filter 76, which filter is designed to provided closed loop stability to the system. The output signal from the loop filter 76 is directed to the G terminal of the FET switch 66. The F terminal of the FET switch is connected to a potentiometer 68 which potentiometer may be adjusted to provide a particular voltage, of a D.C. level, which voltage is used to provide a forced change in the rate of the VCO output signal. Terminal E of the FET switch 66 is connected to the input of the VCO 70 to allow the voltage appearing on terminal E to drive the VCO. The output CLOCK signal from VCO 70 is applied to the phase dither circuit 45 and to the clocking input of the PN generator 35.

The bit timing loop circuit 44 of FIG. 2 provides a data clock signal to the PN timing recovery loop 48. The rate and the synchronization of the data clock signal corresponds to the data rate of the received PSK carrier modulated signal. The data clock signal is applied to the input of a divide-by-four circuit 78. This waveform is shown in FIG. 10a. The NOR gate 79 receives as one input the data clock signal. The NOR gate 79 also receives as an input the noncomplement of the signal corresponding to the data clock rate divided-by-four which signal is provided by the divide-by-four circuit 78. The NOR gate 80 receives as its other input the complement of the data clock signal divided by four. The complement signal from the divided-by-four circuit is also directed, as a control signal, to the phase dither network 45. This waveform can be seen in FIG. 10b. The output signals from the NOR gates 79 and 80 drive one shot multivibrators 79a and 80a which send out a narrow pulse for every positive edge input signal they receive. In comparing FIG. 10c with FIG. 10e it can be seen that the positive leading edge of each pulse shown in FIG. 10c causes a narrow pulse at the output of the one shot multivibrator as shown in FIG. 10e. The same holds true for the pulses shown in FIG. 10d as compared with the pulses of FIG. 10f. The output pulses from the one shot 79a set the FET switch 73 to terminal H and the output pulses from one shot 80a set the FET switch to terminal I.

In operation, when the clocking signal from the VCO 70 is driving the PN generator 35 at a rate which is synchronized to the PN sequence contained in the PSK signal, the level of the signal detected by the threshold detector 65 is of such a magnitude that the FET switch 66 is positioned at the terminal G. This position is considered to be the lock position and the signal from the envelope detector 60 passing through amplifier 72, switch 73, summer 75 and loop filter 76, will then control the output signal from the VCO 70. In this lock position, FET swtich 73 separates the amplitude variations caused by the dithering of the local PN sequence into two signals which appear at terminals H and I of FET switch 73. The signal at terminal H has an amplitude which is the effect of the local PN being dithered to one direction and the amplitude of the signal at terminal I is the effect of the local PN being dithered in the opposite direction. FIG. 9 shows amplitude and phase relationships caused by the dithering. The difference voltage of the signals at terminals H and I appears, at the output of the summer 75. This difference voltage is averaged in loop filter 76, and the averaged voltage is applied to the VCO 70 control line to direct the VCO towards a frequency which will correct the phase error between the local and receive PN sequences. In other words, the only change that occurs in the closed loop path, from the envelope detector 60 to the VCO 70, occurs when the inverter 74 is toggled in and out of the closed loop path by the FET switch 73. Therefore, if at the input of the summer 75 with the switch 73 in the H position we have, for a locked condition, a signal of +0.1 millivolts, when the switch 73 is toggled to I position the summer 75 will receive at its other input a signal of −0.2 millivolts. The summer then effectively will see a signal which alternates symmetrically around a zero reference point at a rate determined by the toggling rate of the FET switch 73. The average voltage of this signal will therefore be zero when the phase difference between the received PN sequence and the local generated PN sequence is zero. When the VCO 70 receives a zero level signal on its input it does not change its output signal.

The waveform of FIG. 10h shows a change from the waveform of FIG. 10g which change is caused by a slight phase error. This phase error causes a change in the amplitude of the signals passed by the summer. For the particular condition shown, the phase error is such as to change the amplitude of the samples passed when the one shot 79a is activated. As a result, the amplitudes of the negative-going pulses shown in FIG 10i are less than the amplitudes of the positive-going pulses. An averaging of these pulses in the loop filter 76 will result in a positive signal which signal when applied to the VCO 70 will drive the VCO in a direction which will tend to drive the phase error towards zero. If the phase error increases to a point where lock is completely lost then the FET switch 66 does not receive a signal of sufficient magnitude from the threshold detector 65, and terminal E is therefore switched to the positioned indicated by terminal F. Lock will be lost when, referring back to FIG. 9, the phase difference between the local PN sequence and the received PN sequence decreases the amplitude of the envelope detected waveform below the predetermined level set by the threshold detector 65. In this position the D.C. voltage provided by the potentiometer 68 causes the PN generator 35 to change its output rate to search for a position which will allow the threshold detector to be activated. The D.C. sweep voltage is coupled from the FET switch 66 to the input of the VCO 70. The D.C. voltage causes the VCO to change its rate in proportion to the level of the D.C. voltage. In turn, the output of the VCO changes the rate of the signal provided by the PN generator 35.

Figure 5:
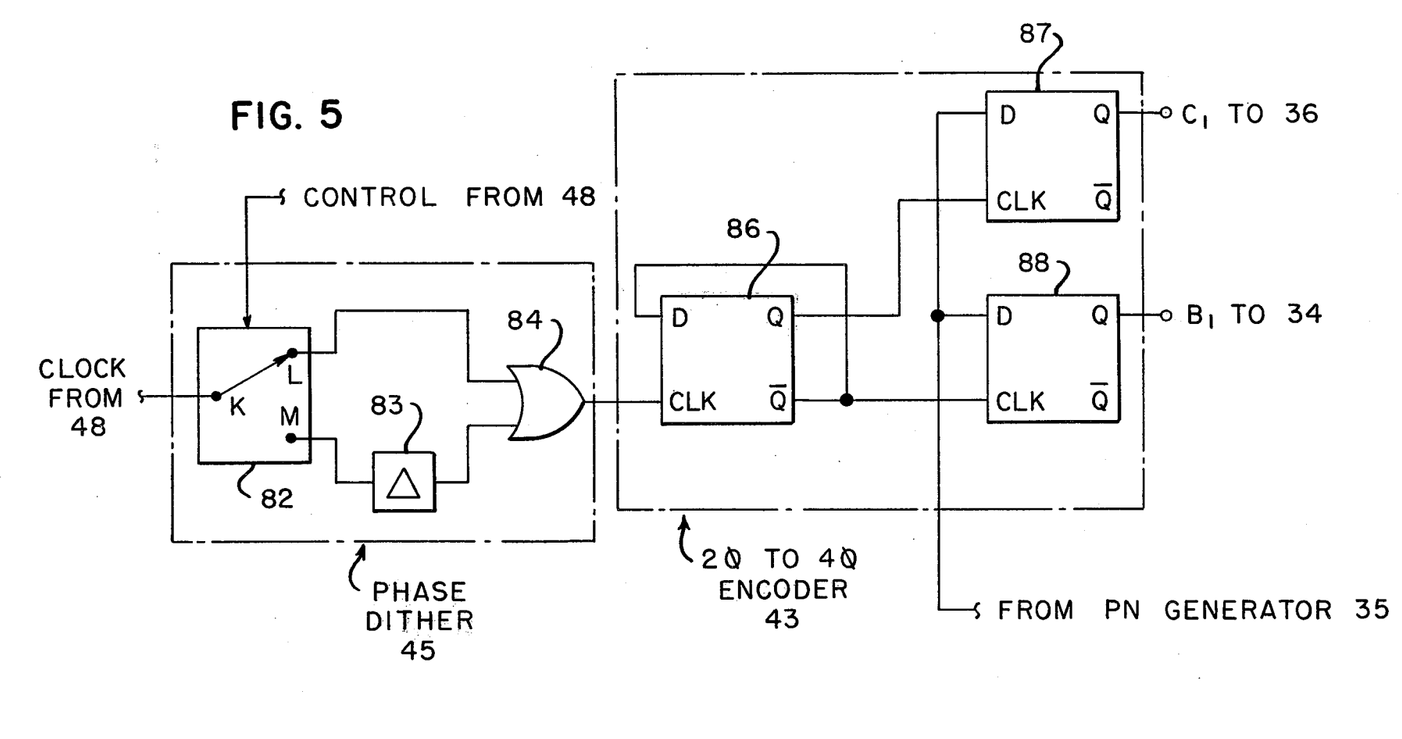
FIG. 5 illustrates in a detailed block diagram form two of the blocks associated with the preferred embodiment of FIG. 2.

Referring now to FIG. 5 wherein the phase dither circuit 45 and the 20 to 40 converter circuit 43 are shown; the clock signal from the PN timing recovery loop 48 is applied to the K terminal of an FET switch 82. Terminal K is toggled between terminal L and terminal M by means of a control signal from the PN recovery loop 48. Terminal L of the FET switch 82 is connected to an input of an OR gate 84. Terminal M is connected by means of a fixed delay network 83 to the other input of the OR gate 84. The output of the OR gate 84 is fed to the clocking terminal of a D-type flip-flop 86. The $\bar{Q}$ output of the flip-flop 86 is fed back to the D input. The Q output of flip-flop 86 is connected to the clocking input of a D-type flip-flop 87. The $\bar{Q}$ output of flip-flop 86 is also connected to the clocking input of a D-type flip-flop 88. The D inputs of flip-flops 87 and 88 are connected to the output of the PN generator 35. A D-type flip-flop is one in which the signal present at the data input D appears at the Q output, after the occurrence of a particular clocking transition, and remains at the Q output until the occurrence of the next line clocking transition. In effect what is occurring is that the signal from the PN generator 35 is being controllably gated to the output terminals labeled $C_1$ and $B_1$, alternately, so that the two phase PN sequence is being divided into two separate channels of two phase data. With the transition of data being of a binary nature, in which each of the two levels represents a difference phase. The fact that there are now two signals each having two phases essentially converts the two phase PN sequence into a four phase sequence. The phase dither network periodically introduces a fixed delay into the clock signal from the PN timing recovery loop 48 so as to dither the signals at the terminals C1 and B1.

Figure 6:
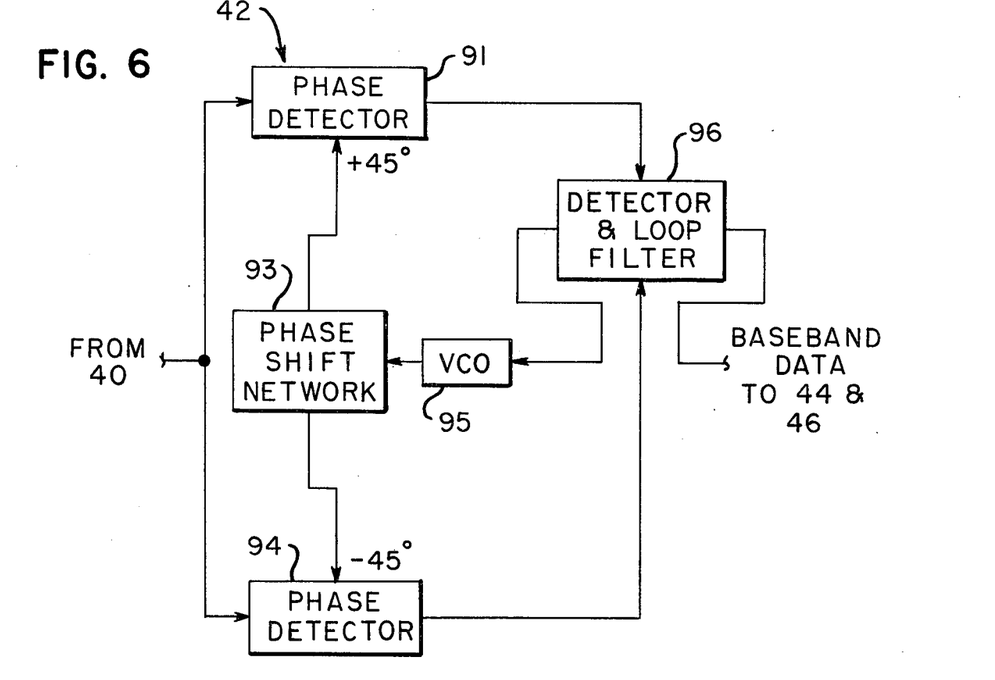
FIG. 6 illustrates in block diagram form a carrier recovery phaselock loop which may be used in the preferred embodiment of FIG. 2.

Referring now to FIG. 6 wherein the block diagram of the carrier recovery phaselock loop 42 of FIG. 2 is shown; the signal from the amplifier 40 is applied to the inputs of phase detectors 91 and 94. A voltage controlled oscillator 95 in response to a control signal from a detector and loop filter circuit 96 provides a carrier signal to the phase shift network 93. The phase shift network 93 provides two output signals, one of which is shifted +45° in phase with respect to the signal from the VCO 95, and the other of which is shifted −45° in phase. The phase detectors 91 and 94 each provide an output signal, the D.C. level of which is a function of the phase difference between the signal received from the phase shift network 93 and the signal received from the amplifier 40. This difference signal is applied as an input to the detector and loop filter circuit 96. The circuit 96 compares these signals to provide the control signal for the VCO 95 which control signal drives the VCO in a particular direction so as to minimize the phase difference between the input signals to the respective phase detectors. In addition, the detector and loop filter circuit 96 provides the baseband data signal to the bit timing loop 44 and to the sample and hold circuit 46.

Figure 7:
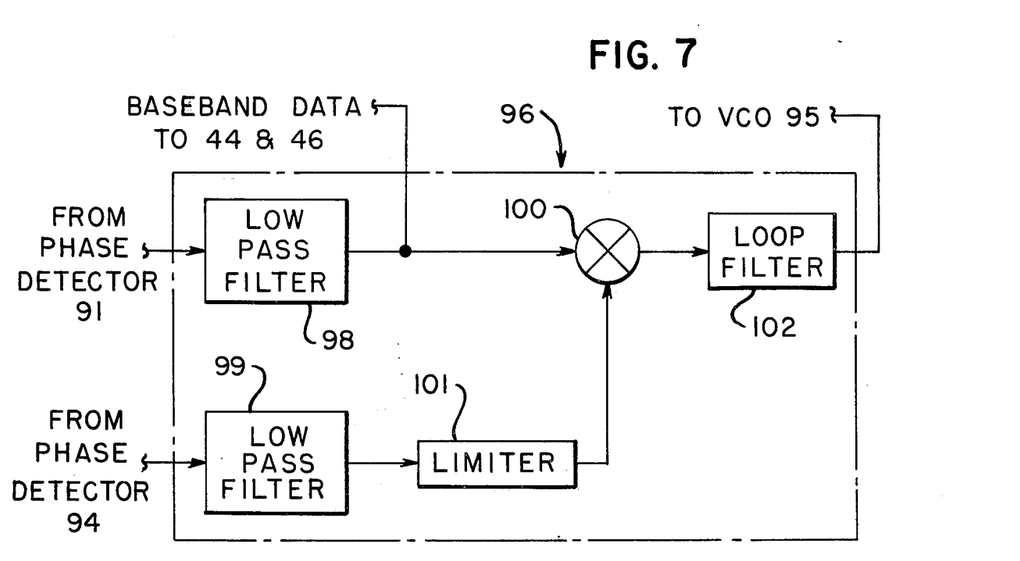
FIG. 7 illustrates in block diagram form a portion of the carrier recovery phaselock loop shown in FIG. 6.

In FIG. 7 there is illustrated a particular detector and loop filter circuit which may be used for the circuit 96 shown in FIG. 6. The signals from the phase detectors 91 and 94 are fed to low pass filters 98 and 99, respectively. The filtered output signal from the low pass filter 98 is the baseband data signal, which signal is fed to the bit timing loop 44 and the sample and hold circuit 46 and also to the input of a phase detector 100. The filtered signal from the low pass filter 99 is amplitude limited in a limiter 101 to form a square wave signal having a high stage and a low state. The phase detector 100 responds to the square wave signal from 101 by passing the signal from the low pass filter 98 when the square wave signal is in its high state and by inverting and passing the signal from the low pass filter 98 when the square wave signal is in its low state. The output signal from the multiplier 100 is directed to a loop filter 102. The loop filter 102 has a transfer function (impedance characteristic) which is designed to equalize the response of the carrier recovery phaselock loop 42 so as to facilitate locking of the signals from the phase shift network to the carrier of the received signal from amplifier 40. The equalized signal from the loop filter 102 is applied as the control signal to the VCO 95.

Figure 11A:
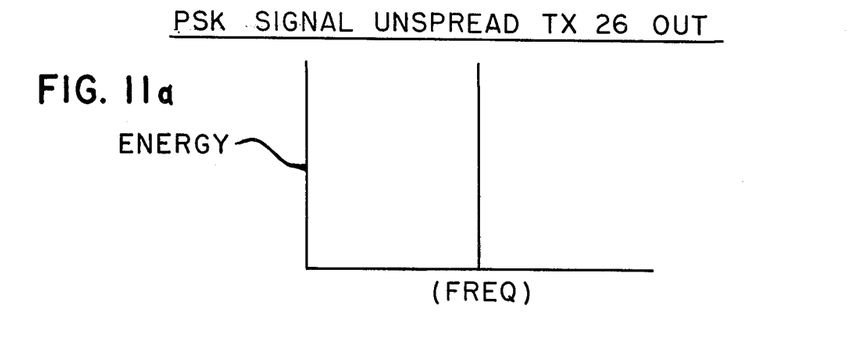
FIGS. 11a to 11d illustrate in chart form signal frequency spectrums which spectrums are useful in understanding the operation of the invention.
Figure 11B:
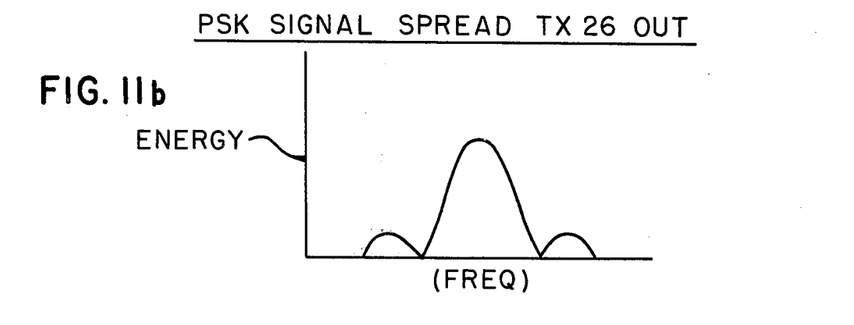
Figure 11C:
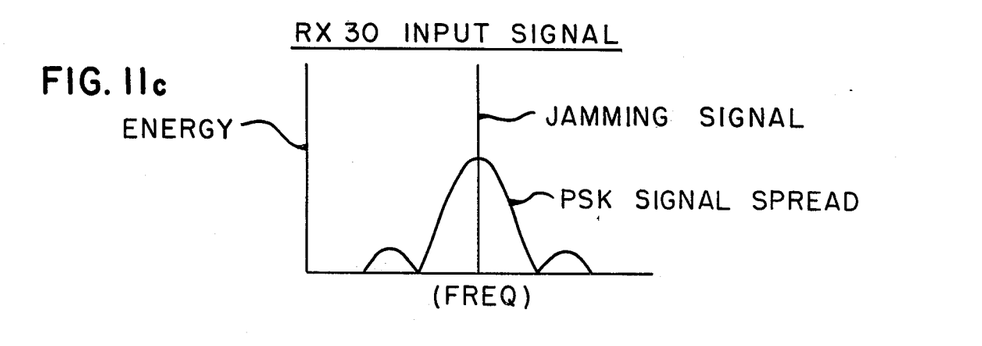
Figure 11D:
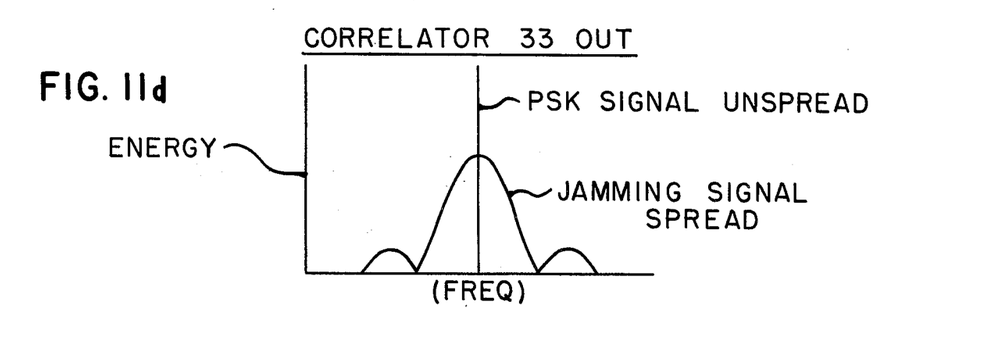

FIGS. 11a to 11d set forth the generalized waveforms associated with spectrums of spread and unspread signals. In FIG. 1 if the signal transmitted by the transmitter TX26 is not spread in spectrum it will have a frequency spectrum of the type shown in FIG. 11a. With spectrum spreading, the signal from TX26 will be of the type shown in FIG. 11b. FIG. 11c illustrates the signals preset at the input of the receiver RX30, shown in FIG. 2, when a spread spectrum PSK signal is received along with a jamming signal. The jamming signal has a frequency which is matched to the frequency of the non-spread PSK signal. In normal receiver operation the jamming signal would effectively prevent intelligent detection of the non-spread PSK signal. With spectrum spreading the correlator 33 is able to spread the spectrum of the jamming signal and to collapse the spectrum of the PSK signal. The results are shown in FIG. 11d. The energy of the PSK signal is such that it can be detected even though the jamming signal is present.

While the system and apparatus hereof accomplishes the objects and advantages mentioned, certain variations may occur to those skilled in the art and it is contemplated that all such variations not departing from the spirit and scope of the invention hereof are to be construed in accordance with the following claims.

What is claimed is:

1. A spread spectrum system comprising:
    means for generating a carrier signal;
    modulating means responsive to a binary information signal for spread spectrum modulating said generated local carrier signal;
    means for transmitting the spread spectrum modulated carrier signal;
    means for receiving and collapsing the spread spectrum of a received spread spectrum modulated carrier signal to provide a non-spread spectrum modulated carrier signal;
    a matched filter responsive to said non-spread spectrum modulated carrier signal for provoding an intermediate signal which contains the modulation components of the binary information signal;
    a carrier recovery circuit responsive to the intermediate signal from said matched filter for providing a baseband signal; and
    means for detecting the binary information signal from said baseband signal.

2. The spread spectrum system according to claim 1 wherein said modulating means is comprised of:
    generator means for generating a random sequence of pulses;
    encoding means for phase encoding said pulses;
    combining means for combining the encoded random pulses with said binary information signal to provide modulating signals; and
    phase modulating means for modulating said generated carrier signal as a function of said modulating signals.

3. The spread spectrum system according to claim 1 wherein said means for collapsing the spread spectrum of the received spread spectrum modulated carrier signal is comprised of:
    a local generator means for generating a local random sequence of pulses corresponding to the random sequence of pulses contained in the received signal;
    correlating means operatively connecting said local generator means to said means for receiving, for correlating said local random sequence of pulses against the random sequence of pulses contained in the received signal to provide a non-spread spectrum modulated carrier signal.

4. The spread spectrum system according to claim 3 and further comprising:
    means operatively connected to said local generator means for synchronizing said local random sequence of pulses with the random sequence of pulses contained in the received signal.

5. The spread spectrum system according to claim 1 wherein said matched filter is a surface acoustic wave device.

6. The spread spectrum system according to claim 4 and further comprising:
    means operatively connected to said local generator means for dithering the synchronizing of said local random sequence of pulses to the random sequence of pulses contained in the received signal.

7. A spread spectrum demodulator comprising:
    means for receiving a four-phase encoded spread spectrum signal;
    means for converting the received four-phase encoded spread spectrum signal into a two-phase encoded non-spread spectrum signal;
    matched filter means operatively connected to said means for converting, for filtering said two-phase encoded non-spread spectrum signal so as to filter all but desired signal components from said signal; and
    carrier recovery means responsive to the filtered signal from said matched filter for demodulating said signal to provide a decoded baseband signal.

8. The spread spectrum demodulator according to claim 7 wherein said matched filter is comprised of a surface acoustic wave device.

9. The spread spectrum demodulator according to claim 7 wherein said four-phase encoded spread spectrum signal is a phase shift keyed modulated carrier signal encoded with a random sequence of pulses combined with an information data signal and wherein said means for converting comprises:
    means for generating a local random sequence of pulses corresponding to the random sequence of pulses contained in the received signal; and
    correlating means for correlating said local random sequence of pulses with the random sequence of pulses contained in the received signal to provide said two-phase encoded non-spread spectrum signal.

10. The spread spectrum demodulator according to claim 9 and further comprising:
    means for synchronizing said local random sequence of pulses to the random sequence of pulses contained in the received signal.

11. The spread spectrum demodulator according to claim 10 and further comprising:

means for dithering the synchronization of said local random sequence of pulses.

12. A spread spectrum transmission system for processing a binary information signal comprising:

means for generating a carrier signal;

generating means for generating a pseudo-random sequence of pulses;

encoding means for phase encoding said pulses;

mixing means for mixing the phase encoded pulses from said encoding means with a binary information signal to provide modulating signals;

phase modulating means for modulating said generated carrier signal as a function of said modulating signals so as to provide a spread spectrum modulated signal;

transmitter means for transmitting the modulated signal from said phase modulating means;

receiver means for receiving the signal transmitted by said transmitter means;

second generating means for generating a local pseudo-random sequence of pulses;

correlating means having as inputs the received signal from said receiver means and said local pseudo-random sequence of pulses for correlating the input signals so as to collapse the spread spectrum of said received signal;

matched filter means responsive to the collapsed spread spectrum signal from said correlating means for filtering undesired signal components from said signal to provide an output signal corresponding to an intermediate signal;

demodulation means operatively connected to the output of said matched filter means for demodulating the intermediate signal to provide said binary information signal; and timing means responsive to the signals from said matched filter and said demodulation means for providing a control signal to said second generating means to synchronize the local pseudo-random sequence of pulses to the pseudo-random sequence of pulses contained in said received signal.

13. The spread spectrum transmission system according to claim 12, wherein said matched filter is a surface acoustic wave device.

14. The spread spectrum transmission according to claim 12 and further comprising:

means operatively connected to said second generating means for dithering the synchronizing of said local psuedo-random sequence of pulses to the pseudo-random sequence of pulses contained in said received signal.

* * * * *